US006899653B2

(12) United States Patent
Murphy

(10) Patent No.: US 6,899,653 B2
(45) Date of Patent: May 31, 2005

(54) FASTENER WITH GEAR ASSEMBLY

(76) Inventor: Raymond J. Murphy, 1 Ashbury La., Barrington Hills, IL (US) 60010

(*) Notice: Subject to any disclaimer, the term of this patent is extended or adjusted under 35 U.S.C. 154(b) by 0 days.

(21) Appl. No.: 10/637,248

(22) Filed: Aug. 8, 2003

(65) Prior Publication Data

US 2004/0092358 A1 May 13, 2004

Related U.S. Application Data

(60) Provisional application No. 60/402,284, filed on Aug. 9, 2002.

(51) Int. Cl.[7] .................................................. F16H 3/44

(52) U.S. Cl. ....................................... 475/317; 81/57.31

(58) Field of Search ................................. 475/317, 320; 81/57–31

(56) References Cited

U.S. PATENT DOCUMENTS 2,721,591 A * 10/1955 Criswell ........................ 81/28
4,448,098 A * 5/1984 Totsu .......................... 81/467
5,135,086 A 8/1992 Ciolli

* cited by examiner

*Primary Examiner*—Dirk Wright
(74) *Attorney, Agent, or Firm*—Meroni & Meroni, P.C.; Charles F. Meroni, Jr.

(57) ABSTRACT

A fastener with a reduced gear affect. The fastener of the present invention comprises a handle assembly having an end and an opening wherein a shaft assembly is positioned within the opening and extending from the opening. The fastener further comprises a switch assembly positioned between the handle assembly and the shaft assembly wherein the switch assembly reciprocates between a locked position and an unlocked position to control a ratio of revolutions between the handle assembly and the shaft assembly. A method of fastening comprising connecting a shaft assembly to a handle assembly and moving a switching assembly, connected to the handle assembly, to an unlocked position. Next, a gear assembly is connected to the switch assembly which engages the gear assembly to the handle assembly to increase a ratio of revolutions of the shaft assembly as compared to the handle assembly.

18 Claims, 4 Drawing Sheets

FASTENER WITH GEAR ASSEMBLY

REFERENCE TO PRIORITY DOCUMENT

The present invention claims priority, to the extent permitted by law, to U.S. Provisional Application No. 60/402,284 filed on Aug. 9, 2002.

BACKGROUND OF THE INVENTION

The present invention relates to a fastener. In particular, the present invention relates to a fastener, such as a screwdriver, having a switch assembly and gear assembly which can change from a standard driving speed application to a high diving speed application.

Traditional hand held screwdrivers maintain a direct relationship between the revolutions of the handle and the revolutions of the output shaft. This direct relationship results in fatigue and stress on the user's arm and wrists since each handle revolution results in only one revolution of the bit. Accordingly, the typical screwdriver produces a slow fastening process. Further, typical screwdrivers enhance the fatigue and stress in tight and/or difficult work areas having obstacles between the user and the work area. In these types of work areas, the user often adjusts positions of the hand/screwdriver to maneuver around the obstacles. With the direct revolution ratio, this maneuvering increases the time to complete the fastening process leading to increased fatigue and stress.

As demands for increased fastening production and improved quality escalate, a need exists for increasing the fastening process of screwdrivers. The solution, however, must minimize repetitive stress and fatigue injuries. Thus, a need exists for increasing the speed of the output shaft revolutions with respect to the speed of the handle revolutions. The solution, however, must also provide a standard speed of the output shaft to provide a higher torque to the screw.

Accordingly, a need exists for a screwdriver having a high driving speed application which increases the speed and reduces the torque to the screw being turned and having a slow driving speed application which reduces the speed and increases the torque to the screw being turned. The solution, though, must provide a convenient switch mechanism between the high driving speed and the standard driving speed applications. The solution must also provide a switch mechanism incorporating a minimum amount of parts wherein the parts must fit within a comfortable and ergonomic handle.

The prior art does not satisfy the needs and solutions required. Typical hand held screwdrivers provided a ratcheting feature which allows for free back turning. This ratcheting feature, though, does not increase the shaft revolutions as compared to the handle revolutions. Other tools are equipped with a torque control shut off clutch for power tools. These tools are equipped with a clutch mechanism that responds to the torque imparted by the tool to the fastener. When a set torque is reached, the clutch mechanism shuts off the motor from the bit terminating output to the shaft. Accordingly these tools relate to torque control and do not increase the shaft revolutions as compared to the handle revolutions.

SUMMARY OF INVENTION

The present invention relates to a fastener having a switch assembly and gear assembly which changes to increase the speed of the output shaft while reducing the torque to a connector being acted upon. The switch and gear assemblies of the present invention also decrease the speed of the output shaft while increasing the torque to the connector being acted upon. The present invention provides a tool wherein the shaft rotates faster than the handle.

In an embodiment, the present invention comprises a handle assembly having an end and an opening wherein a shaft assembly is positioned within the opening and extending from the opening. The fastener further comprises a switch assembly positioned between the handle assembly and the shaft assembly wherein the switch assembly reciprocates between a locked position and an unlocked position to control a ratio of revolutions between the handle assembly and the shaft assembly. The invention also includes a gear assembly which engages with the plate assembly in the unlocked position and disengages with the plate assembly in the locked position.

An advantage of the present invention is a fastener which can switch between a standard driving speed and a high driving speed.

Another advantage of the present invention is a switch and gear assembly that rotates the shaft faster than the handle to apply significantly more revolutions of the shaft as compared to the revolutions necessary to the handle.

Another advantage of the present invention is reducing fatigue and stress to the user.

DETAILED DESCRIPTION OF THE INVENTION

As stated, the present invention relates to a fastener. In particular, the present invention relates to a fastener having a gear assembly which changes to increase the speed while reducing the torque to a connector being acted upon. The gear assembly of the fastener also changes to decrease the speed while increasing the torque force to the connector.

Figure 1:
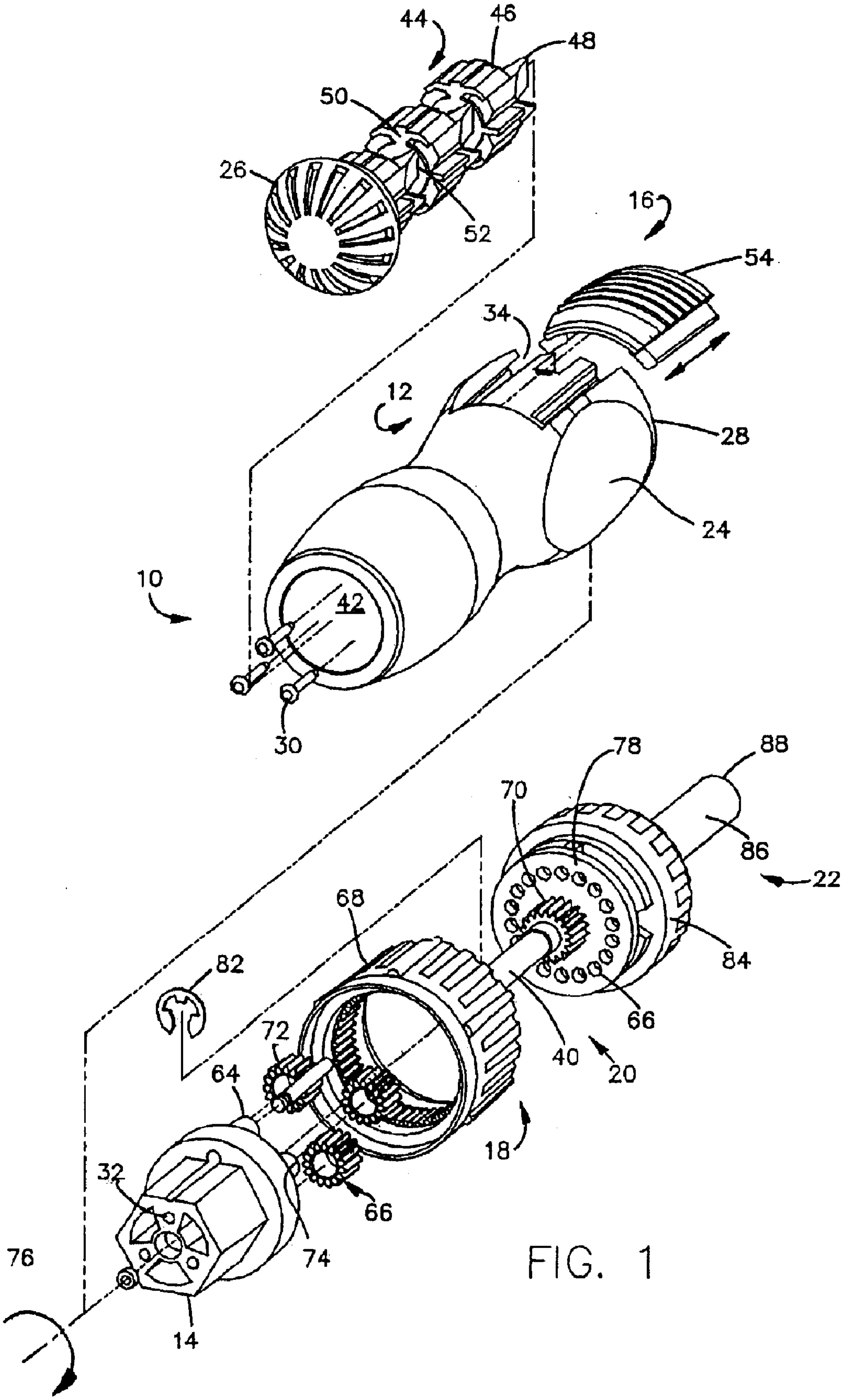
FIG. 1 illustrates in a breakaway perspective view an embodiment of the present invention.

FIG. 1 illustrates a perspective breakaway view of an exemplary fastener tool generally shown as 10. The tool 10 comprises a handle assembly generally shown as 12, an insert 14, a switch assembly generally shown as 16, a gear assembly generally shown as 18, a plate assembly generally shown as 20 and a shaft assembly generally shown as 22.

The handle assembly 12 comprises a handle 24 having an end 26 and a cut out or opening 28. The handle 24, made from a chemically resistant material, ergonomically fits comfortably in the user's hands. The opening 28 is sized and shaped to mate with the insert 14 wherein a fastener 30, such as a screw(s), connects the handle 24 to the insert 14 via holes 32 positioned within the handle 24 and the insert 14. The handle 24 further positions a track 34 near the opening 28. The track 34, in turn, engages with the switch assembly 16 as will be discussed.

Figure 2:
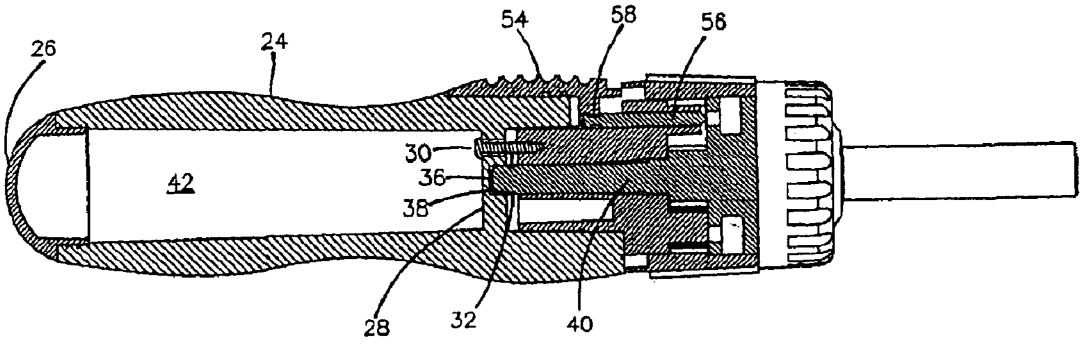
FIG. 2 illustrates in a side view an embodiment of the present invention.

Turning to FIG. 2, the present invention positions a bearing 36 inserted into a depression 38 wherein the bearing 36 supports a shaft 40 during use. As shown in FIG. 2, the handle 24 also contains a chamber 42 disposed between the end 26 and the opening 28. The chamber 42 is preferably hollow to provide a storage space.

Returning to FIG. 1, the chamber 42 is configured to store an accessory holder generally shown as 44. The accessory holder 44 slides in and out of the chamber 42 via the end 26 wherein the accessory holder 44 may be fixed or removably attached to the end 26. The end 26, meanwhile, is removable from the handle 24 to expose the chamber 42 and accessory holder 44. In an embodiment, the end 26 may connect to the handle 24 and chamber 42 by threads. In another embodiment, the end 26 may rotate off the handle 24 via a hinge.

The accessory holder 44 comprises at least one clamp 46 wherein each clamp 46 holds an accessory 48 such as a bit. In an embodiment, the clamps 46 are grouped in a ring 50 wherein a core 52 distances the rings 50 from each other. The distancing of the rings 50 allows adequate space for the user to easily remove and replace the accessories 48 without interference from the other accessories 48 positioned within the rings 50. The rings 50, however, are positioned close enough to maximize the number of accessories within the chamber 42.

Returning to FIG. 2, the switch assembly 16 comprises a switch 54 located on the handle 24 and near the opening 28 wherein the switch 54 reciprocates back and forth within the track 34 of the handle 24. A torque pin 56 connects with the switch 54 via a connector 58. Accordingly, the torque pin 56 reciprocates with the switch 54.

Figure 3:
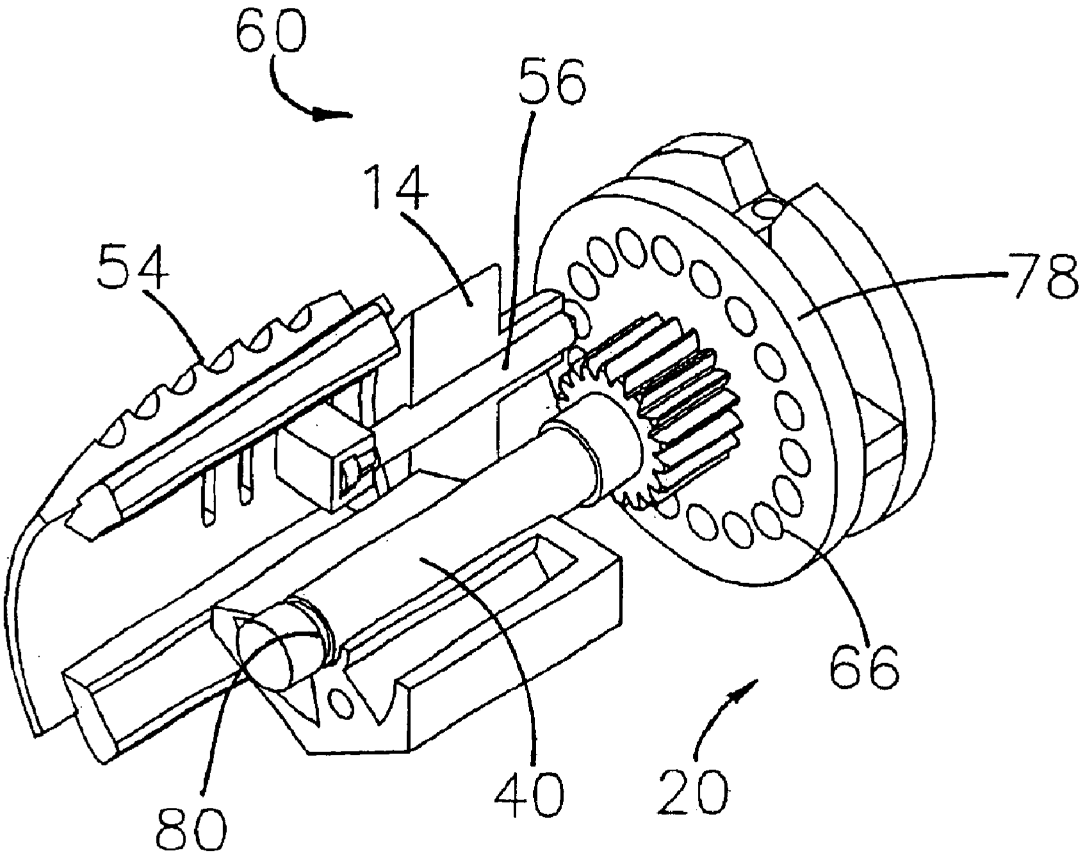
FIG. 3 illustrates in a partial view elements of the present invention.
Figure 4:
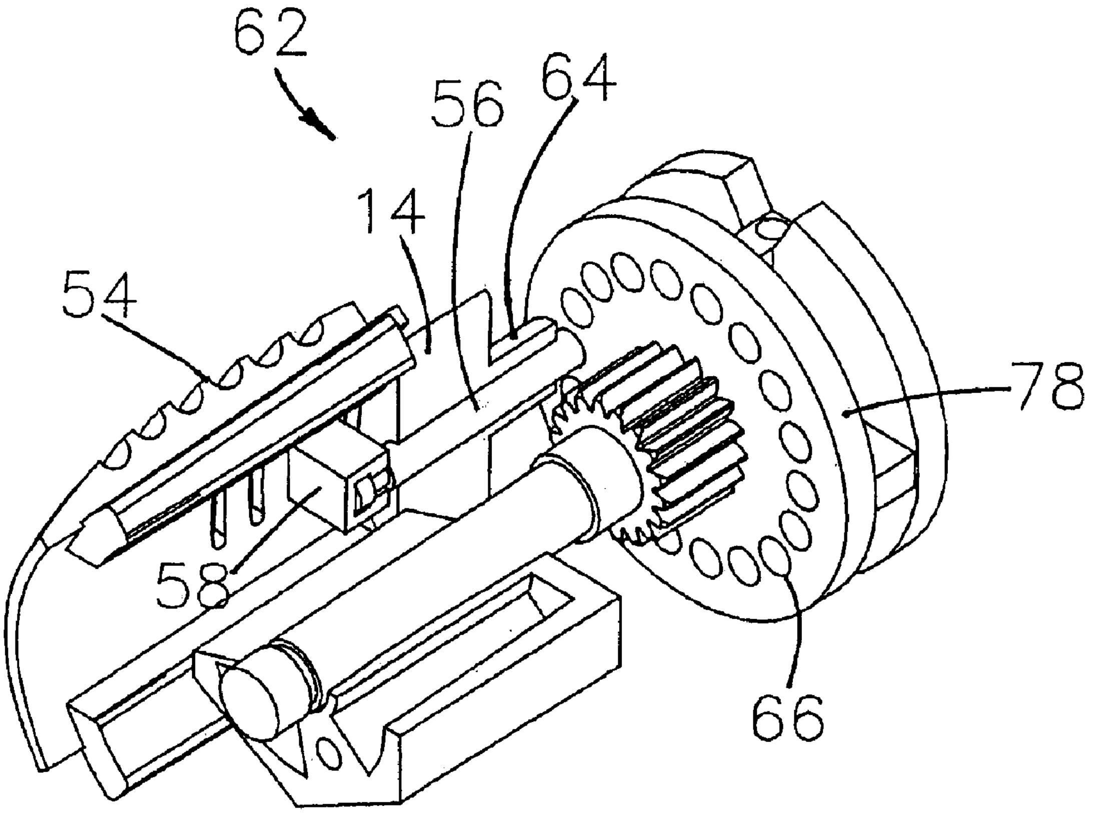
FIG. 4 illustrates in a partial view elements of the present invention.

Turning to FIGS. 3 and 4, the switch 54 is shown in cross sectional partial view. In FIG. 3, the switch 54 is shown in the unlocked position generally shown as 60. In the unlocked position 60, the switch 54 is positioned toward the end 26 (shown in FIG. 2) and away from the insert 14. Accordingly, the torque pin 56 is pulled away from the plate assembly 20 since the torque pin 56 is connected to the switch 54. As shown in FIG. 3, the torque pin 56 reciprocates within the insert 14.

Turning to FIG. 4, the switch 54 is shown in the locked position generally shown as 62 with the switch 54 being positioned toward the insert 14. As shown in FIG. 4, the connector 58 moves the torque pin 56 through the insert 14 wherein the torque pin 56 extends beyond an insert opening 64 to connect with at least one plate opening 66 associated with the plate assembly 20 as will be discussed.

Returning to FIG. 1, the gear assembly 18 is shown in a perspective breakaway view. The gear assembly 18 comprises a planetary gear system 66, a ring gear 68 and a sun gear 70. The planetary gear system 66 comprises at least one planetary gear 72 which resides evenly on at least one insert pin 74. The insert 14 and insert pins 74 are molded together as one component for increased strength.

The planetary gears 72 connect to the insert pins 74 so that the external teeth of the planetary gears 72 engage the internal teeth of the ring gear 68. Additionally, the planetary gears 72 are positioned around the sun gear 70.

The planetary gears 72 engage with the ring gear 68 for a gearing affect. In the present invention, the ring gear 68 contains a greater number of teeth as compared to the number of teeth of the sun gear 70 to create the reducing effect. The gear ratio of the ring gear 68 to the sun gear 70 may be increased by decreasing the number of external teeth on sun gear 70 or by increasing the number of internal teeth on the ring gear 68. The gear reduction ratio may also be decreased by increasing the number of external teeth on the sun gear 70 or by decreasing the number of internal teeth on the ring gear 68.

Still referring to FIG. 1, the plate assembly 20 comprises the plate shaft 40, a plate 78 and plate openings 66 positioned around the plate 78. In an embodiment, the plate openings 66 are positioned substantially near each other. In an embodiment, the plate openings 66 are set at 0.10 mm increments. The plate assembly 20 also rotates around the axis 76 during use. Accordingly, during any rotation of the plate assembly 20, the plate openings 60 provide a plurality of engagement opportunities with respect to the torque pin 56 in the locked position 62 (FIG. 4).

As shown in FIG. 3, the plate shaft 40 has a ring 80 cut into the circumference of the plate shaft 40 wherein a ring connector 82 (FIG. 1) connects with the ring 80. When assembled, the ring 80 and ring connector 82 holds the plate assembly 20 and the gear assembly 18 together.

Returning to FIG. 1, the sun gear 70 surrounds the plate shaft 40 while attaching to the plate 78. Accordingly, the sun gear 70 faces the planetary gears 72 and the ring gear 68. Thus, when assembled, the sun gear 70 fits between the planetary gears 72. In an embodiment, the sun gear 70 is molded as one part with the plate shaft 40. In another embodiment, the sun gear 70 may be press fit with a geometrical interior shape, such as hexagonal, to match the geometric shape of the plate shaft 40.

The shaft assembly 22 comprises a cover 84, a shaft 86 and a shaft opening 88 as shown in FIG. 1. The shaft assembly 22 connects to the plate assembly 20 via the cover 84. As known in the art, the shaft opening 88 receives the appropriate accessory 48 for processing. The shaft opening 88 is sized to hold all standard accessories 48 in accordance with ANSI and DIN standards. In an embodiment, the shaft opening 88 has a hexagonal opening which is magnetized to further assist the insertion of accessories 48 into the shaft opening 88. The shaft 86 may include any output fastener such as a screwdriver blade, a socket or similar device for coupling the tool 10 to the accessory 48.

The shaft assembly 22 further incorporates three working positions of a ratcheting feature (forward, lock, reverse) wherein the forward position relates to clockwise movement of the shaft 86, the reverse position relates to counter clockwise movement of the shaft 86 and the lock position relates to either clockwise or counter clockwise movement of the shaft 86.

The present invention provides that the switch assembly 16, the gear assembly 18 and the plate assembly 20 interact in the unlocked position 60 to produce a gear reduction affect wherein the shaft 86 turns a greater number of revolutions than the handle 24. The present invention also provides that the switch assembly 16, the gear assembly 18 and the plate assembly 20 do not interact in the locked position 62 to produce a 1:1 ratio of revolutions of the shaft 86 to the handle 24.

During use, the user removes the end 26 from the handle to expose the chamber 42. Next, the user removes the accessory holder 44 from the chamber 42 to choose the appropriate accessory 48 which is then inserted into the shaft opening 88. Upon re-connecting the end 26 to the handle 24, the user decides which working position of the ratcheting feature by selecting the forward, the lock or the reverse position depending on whether a clockwise or counter clockwise rotation is needed.

The user then selects either the unlocked position 60 or the unlocked position 62. In the locked position 62 of FIG. 4, the user slides the switch 54 within the track 34 toward the insert 14 to produce a standard driving speed application. Since the connector 58 is integrally formed with the switch 54, the connector 58 moves the torque pin 56 through the insert 14 to extend the torque pin 56 beyond the insert opening 74. To engage the extended torque pin 56 with the plate opening 66 of the plate 78, the user rotates the plate assembly 20 to match up one plate opening 66 with the torque pin 56. Because the plate openings 66 are spaced 0.10 mm around the plate 78, there is little searching or "play" for the torque pin 56 to engage a plate opening 66. Accordingly, the special increments of the plate openings 66 provide convenient switching into the locked position 62.

By engaging the torque pin 56 with the plate opening 66, the gear assembly 18 is bypassed. Thus, the engaged torque pin 56 acts as a clutch disengaging the gear assembly 18 to allow the handle 24, plate assembly 20 and the shaft assembly 22 to rotate co-linear together around the axis 76 in a 1:1 ratio. In other words, when the user rotates the handle 24 a ¼ revolution, the shaft rotates a ¼ revolution. In the locked position 62, the torque is increased by the 1:1 ratio. The speed of revolutions, however, is reduced by the 1:1 ratio. The torque pin 56 withstands the increased torque because the torque pin 56 is a solid, heat treated pin engaged in steel on both sides (i.e. the insert 14 and the plate 78) wherein the torque pin 22 is rated twice the industry standard.

In the unlocked position 60 of FIG. 3, the user slides the switch 54 away from the insert 14 to produce a high driving speed application. Since the connector 58 is integrally formed with the switch 54, the connector 58 retracts the torque pin 56 from the plate opening 66 and away from the plate 78. By disengaging the torque pin 56 from the plate opening 66, the gear assembly 18 is engaged.

With the engaged gear assembly 18, the user holds the outside of the ring gear 68. Simultaneously, the user rotates the handle 24 which rotates the insert 14 and the respective pins 74 of the insert 14. Since the planetary gears 72 are engaged with the pins 74, the planetary gears 72 rotate within the stationary ring gear 68 wherein the external teeth of the planetary gears 72 mate with the internal teeth of the ring gear 68. The sun gear 70 meanwhile rotates via the planetary gears 72 since the planetary gears surround the sun gear 70. Due to the number of teeth of the sun gear 70 compared with the greater number of teeth of the ring gear 68, the sun gear 70 rotates faster than the handle 24. Accordingly, the switch assembly 16 and the gear assembly 18 create a gear affect wherein the shaft 86 rotates faster than the handle 24.

Thus, holding the ring gear 68 and rotating the handle 24 allows the shaft 86 to turn a greater number of revolutions than the handle 24. The present invention increases the ratio of shaft revolutions to the handle revolutions. Accordingly different gear assemblies will produce different ratios wherein the present invention produces shaft revolutions compared to handle revolutions in a ratio greater than 1:1. In an embodiment, the handle 24 and the shaft 86 rotate in a 1:4 ratio. In other words, when the user rotates the handle 24 one revolution in the unlocked position 60, the shaft rotates four revolutions. In the unlocked position 60, the torque is decreased by the 1:4 ratio. The speed of revolutions, however, is increased by the 1:4 ratio.

The present invention provides a tool 10 having a gearing affect to produce a high driving speed application and a standard driving speed application. The switch assembly 16 efficiently and conveniently changes operation to increase the speed of revolutions of the shaft 86 while reducing the torque of the shaft 86 in the high driving speed application. In this high driving speed, the shaft 86 turns faster than the handle 24 resulting in less stress and fatigue to the user's arms and wrists. The switch assembly 16 also changes operation to reduce the speed of the shaft 86 and increase the torque of the shaft 40 in the standard driving speed application. In this standard driving speed, the torque pin 56 bypasses the gear assembly 18 wherein the shaft 86 turns at the same speed as the handle 24 which produces a greater torque than the high driving speed.

Although the description of the specification contains many variables, these should not be construed as limiting the scope of the invention but as merely providing illustrations of some of the embodiments of the invention. For example, the insert can connect with at least one planetary gear while the number and pitch of the teeth for the planetary gears, ring gear and sun gear could be changed to affect the gearing reduction ratio. Additionally, the plate 76 may incorporate a plurality of plate openings with different sizes and spacing. Still further the present invention may be operated manually or may be operated automatically with a motor.

I claim:

1. A fastener, comprising:

a handle assembly, the handle assembly having an end and an opening;

a shaft assembly, the shaft assembly being positioned within the opening and extending from the opening;

a switch assembly, the switch assembly being positioned between the handle assembly and the shaft assembly wherein the switch assembly reciprocates between a locked position and an unlocked position to control a ratio of revolutions between the handle assembly and the shaft assembly; and a plate assembly wherein the plate assembly connects with the switch assembly in the locked position and disconnects with the switch assembly in the unlocked position.

2. The fastener according to claim 1 further comprising a gear assembly wherein the gear assembly engages with the plate assembly in the unlocked position and disengages with the plate assembly in the locked position.

3. The fastener according to claim 1, wherein the switch assembly comprises a torque pin.

4. The fastener according to claim 3, wherein the torque pin connects the switch assembly to the plate assembly in the locked position.

5. The fastener according to claim 1, wherein the plate assembly comprises a plate, the plate having a plurality of plate openings.

6. The fastener according to claim 5, wherein the plurality of plate openings are spaced evenly about the plate.

7. The fastener according to claim 6, wherein the plurality of plate openings are spaced 0.10 mm apart.

8. The fastener according to claim 1, wherein the ratio of revolutions of the handle assembly to the shaft assembly in the locked position is 1:1.

9. The fastener according to claim 1, wherein the ratio of revolutions of the shaft assembly to the handle assembly in the unlocked position is more than 1:1.

10. The fastener according to claim 2, wherein the gear assembly comprises at least one planetary gear, a ring gear, and a sun gear.

11. The fastener according to claim 10, wherein the ring gear has a greater number of teeth than the sun gear.

12. A fastener, comprising:

a handle assembly, the handle assembly having an end and an opening;

a shaft assembly, the shall assembly being positioned within the opening and extending from the opening;

a switch assembly, the switch assembly being positioned between the handle assembly and the shaft assembly wherein the switch assembly reciprocates between a locked position and an unlocked position to control a ratio of revolutions between the handle assembly and the shall assembly;

a plate assembly wherein the plate assembly connects with the switch assembly in the locked position and disconnects with the switch assembly in the unlocked position; and a chamber within the handle assembly.

13. The fastener according to claim 12, further comprising an accessory holder removably positioned within the chamber.

14. A geared fastener, comprising:

a handle assembly, the handle assembly having an end and an opening;

a shaft assembly, the shaft assembly being positioned within the opening and extending from the opening;

a switch assembly, the switch assembly being positioned between the handle assembly and the shaft assembly, the switch assembly having a torque pin wherein the torque pin reciprocates between a locked position and an unlocked position to control a ratio of revolutions between the handle assembly and the shaft assembly; and a plate assembly, the plate assembly having a plurality of plate openings being connected with the torque pin in the locked position and being disconnected with the torque pin in the unlocked position.

15. The geared fastener according to claim 14, further comprising a gear assembly within the gear assembly engages with the plate assembly in the unlocked position and disengages with the plate assembly in the locked position.

16. The geared fastener according to claim 14, wherein the plate assembly comprises a plate, the plate having a plurality of plate openings spaced 0.10 mm apart.

17. The fastener according to claim 14, wherein the ratio of revolutions of the shaft assembly to the handle assembly in the unlocked position is more than 1:1.

18. A geared fastener, comprising:

a handle assembly, the handle assembly having an end and an opening;

a shaft assembly, the shaft assembly being positioned within the opening and extending from the opening;

a switch assembly, the switch assembly being positioned between the handle assembly and the shaft assembly, the switch assembly having a torque pin wherein the torque pin reciprocates between a locked position and an unlocked position to control a ratio of revolutions between the handle assembly and the shaft assembly;

a plate assembly, the plate assembly having a plurality of plate openings being connected with the torque pin in the locked position and being disconnected with the torque pin in the unlocked position; and a gear assembly, the gear assembly being engaged with the plate assembly in the unlocked position and disengages with the plate assembly in the locked position wherein the ratio of revolutions of the handle assembly to the shaft assembly in the locked position is 1:1 and the ratio of revolutions of the shaft assembly to the handle assembly in the unlocked position is greater than 1:1.

* * * * *

UNITED STATES PATENT AND TRADEMARK OFFICE

CERTIFICATE OF CORRECTION

PATENT NO. : 6,899,653 B2

APPLICATION NO. : 10/637248
DATED : May 31, 2005
INVENTOR(S) : Raymond J. Murphy It is certified that error appears in the above-identified patent and that said Letters Patent is hereby corrected as shown below:

Column 1, line 13, “diving” should be --driving--.

Column 6, line 64, “shall” should be --shaft--.

Column 7, line 4, “shall” should be --shaft--.

Signed and Sealed this

Twenty-ninth Day of August, 2006

JON W. DUDAS

*Director of the United States Patent and Trademark Office*